(12) United States Patent
Yarbrough et al.

(10) Patent No.: US 10,669,984 B2
(45) Date of Patent: Jun. 2, 2020

(54) METHOD FOR MANUFACTURING BLADE COMPONENTS USING PRE-CURED LAMINATE MATERIALS

(71) Applicant: General Electric Company, Schenectady, NY (US)

(72) Inventors: Aaron A. Yarbrough, Greenville, SC (US); Christopher Daniel Caruso, Greenville, SC (US); Daniel Alan Hynum, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 333 days.

(21) Appl. No.: 14/860,896

(22) Filed: Sep. 22, 2015

(65) Prior Publication Data
US 2017/0082087 A1    Mar. 23, 2017

(51) Int. Cl.
*B29C 70/02*    (2006.01)
*F03D 1/06*    (2006.01)
*B29D 99/00*    (2010.01)

(52) U.S. Cl.
CPC ....... *F03D 1/0675* (2013.01); *B29D 99/0028* (2013.01); *F05B 2230/50* (2013.01); *F05B 2280/6003* (2013.01); *Y02E 10/721* (2013.01); *Y02P 70/523* (2015.11)

(58) Field of Classification Search
CPC ..... B29C 70/42; B29L 2031/08; F03D 1/0675
See application file for complete search history.

(56) References Cited

U.S. PATENT DOCUMENTS

| 3,454,457 A | * | 7/1969 | Hale | ................ B29C 33/68 156/209 |
| 4,465,537 A | * | 8/1984 | Coleman | ............ F03D 1/065 144/349 |
| 5,217,669 A | * | 6/1993 | Dublinski | ........ B29C 33/307 264/258 |
| 7,473,385 B2 | | 1/2009 | Stiesdal et al. | |

(Continued)

FOREIGN PATENT DOCUMENTS

WO   WO 2012/042261 A1   4/2012
WO   WO 2014//063944 A1   5/2014

OTHER PUBLICATIONS

"Flat," 2008, Merriam-Webster.com, Merriam-Webster, archived on Internet Archive Sep. 7, 2008, https://web.archive.org/web/20080907012834/https://www.merriam-webster.com/dictionary/flat (Year: 2008).*

(Continued)

*Primary Examiner* — Matthew J Daniels
*Assistant Examiner* — Andrew L Swanson
(74) *Attorney, Agent, or Firm* — Dority & Manning, P.A.

(57) ABSTRACT

The present disclosure is directed to a method for manufacturing a blade component for a rotor blade of a wind turbine. The method includes arranging a fiber material in a mold of the blade component. The method also includes placing at least one pre-cured laminate material atop the fiber material. Another step includes infusing the fiber material and the pre-cured laminate material together via a resin material so as to form the blade component. The method also includes allowing the blade component to cure, the pre-cured laminate material forming at least a portion of an outer surface of the blade component.

12 Claims, 8 Drawing Sheets

(56) References Cited

U.S. PATENT DOCUMENTS

| | | |
|---|---|---|
| 7,625,185 B2 | 12/2009 | Wobben |
| 8,157,939 B2 | 4/2012 | Stiesdal |
| 8,297,932 B2 | 10/2012 | Arocena De La Rua et al. |
| 8,353,674 B2 | 1/2013 | Bech |
| 8,506,258 B2 | 8/2013 | Baker et al. |
| 8,540,491 B2 | 9/2013 | Gruhn et al. |
| 2004/0253114 A1* | 12/2004 | Gunneskov ............ F03D 1/065 416/224 |
| 2007/0251090 A1* | 11/2007 | Breugel ................ B29C 70/30 29/889.7 |
| 2009/0017573 A1 | 1/2009 | Mouli |
| 2009/0220747 A1* | 9/2009 | Karem ................ B29C 70/545 428/172 |
| 2010/0098549 A1 | 4/2010 | Mironov |
| 2011/0031758 A1 | 2/2011 | Mitsuoka et al. |
| 2011/0037191 A1 | 2/2011 | Stiesdal |
| 2011/0135485 A1* | 6/2011 | Wang ................... F03D 1/0675 416/226 |
| 2012/0039720 A1 | 2/2012 | Bech |
| 2012/0067515 A1 | 3/2012 | Dahl et al. |
| 2012/0237356 A1 | 9/2012 | Mironov |
| 2012/0298800 A1* | 11/2012 | Albertson .............. B29C 70/44 244/119 |
| 2013/0049249 A1* | 2/2013 | Frankowski .......... B29C 70/443 264/102 |
| 2013/0333823 A1 | 12/2013 | Hedges et al. |
| 2014/0003956 A1 | 1/2014 | Lull et al. |
| 2015/0224759 A1 | 8/2015 | Boon |
| 2015/0224760 A1 | 8/2015 | Eyb et al. |
| 2016/0263844 A1* | 9/2016 | Smith .................. B29C 70/525 |

OTHER PUBLICATIONS

Teuwen et al., Vacuum Infused Thermoplastic Composites for Wind Turbine Blades, 2008 Wind Turbine Blade Workshop—Sandia National Laboratories, Jun. 3, 2008, 22 pages.

* cited by examiner

METHOD FOR MANUFACTURING BLADE COMPONENTS USING PRE-CURED LAMINATE MATERIALS

FIELD OF THE INVENTION

The present invention relates generally to the field of wind turbines, and more particularly to systems and methods for manufacturing blade components using pre-cured laminate materials as tooling and/or mold surfaces.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades are the primary elements for converting wind energy into electrical energy. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to the generator for producing electricity.

The rotor blades typically consist of a suction side shell and a pressure side shell that are bonded together at bond lines along the leading and trailing edges of the blade. An internal shear web extends between the pressure and suction side shell members and is bonded to spar caps affixed to the inner faces of the shell members. With typical blade configurations, the shear web is a continuous member that spans between the spar caps. The shear web is typically constructed of a core material laminated together with a rigid flange to achieve a desired bond width for bond paste applied between the spar caps and transverse ends of the shear web. Many of the blade components are constructed of a composite laminate materials optionally reinforced with one or more fiber materials, e.g. via a resin infusion process.

For example, many blade components are formed using a vacuum-assisted resin transfer molding (VARTM). The VARTM process is a technique that uses vacuum pressure to drive resin into a mold. More specifically, fiber or fabric materials or plies are laid dry into the mold and covered with an infusion bag. Vacuum is then applied and resin is introduced into the mold to form the blade component.

During the infusion process, however, bridging may occur under the infusion bag. As used herein, the term "bridging" of the infusion bag occurs when the bag does not fit into the corners of the mold, thereby resulting in resin-rich areas. Such areas can reduce the strength and/or quality of the finished part. Thus, such defects must be removed from each part before manufacturing of the part is complete.

Accordingly, the industry would benefit from an improved manufacturing process for blade components that addresses one or more of the aforementioned deficiencies.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for manufacturing a blade component for a rotor blade of a wind turbine. The method may include arranging a fiber material in a mold of the blade component. The method may also include placing at least one pre-cured laminate material atop the fiber material. Another step may include infusing the fiber material and the pre-cured laminate material together via a resin material so as to form the blade component. The method may also include allowing the blade component to cure such that the pre-cured laminate material forms at least a portion of an outer surface of the blade component.

In one embodiment, the fiber material may include a plurality of fiber plies. In addition, the fiber material may include at least one of glass fibers, carbon fibers, metal fibers, polymer fibers, ceramic fibers, nanofibers, or combinations thereof. In further embodiments, the method may also include placing a core material between the plurality of fiber plies.

In another embodiment, the pre-cured laminate material(s) may include a pre-cured laminate plate. More specifically, in certain embodiments, the pre-cured laminate plate may be a pultruded plate. Thus, in additional embodiments, the method may further include placing a plurality of pre-cured laminate plates atop the plurality of fiber plies. Further, in certain embodiments, the method may include placing a plurality of pre-cured laminate plates intermittently with the plurality of fiber plies.

In yet another embodiment, the resin material may include at least one of a thermoset material, a thermoplastic material, or combinations thereof.

In another aspect, the present disclosure is directed to a method for manufacturing a blade component for a rotor blade of a wind turbine. The method may include arranging a plurality of fiber plies in a mold of the blade component. The method may also include placing a pultruded laminate plate adjacent to the plurality of fiber plies in the mold. Another step may include infusing the plurality of fiber plies together via a resin material with the pultruded laminate plate adjacent thereto so as to form the blade component. Thus, the method may further include allowing the blade component to cure in the mold. Still another step includes removing the pultruded laminate plate from the cured blade component in the mold and removing the blade component from the mold.

In another embodiment, the pultruded laminate plate may include one or more resin and/or vacuum channels configured therein so as to assist with the infusing step.

In yet another aspect, the present disclosure is directed to a method for manufacturing a blade component for a rotor blade of a wind turbine. The method may include forming a mold of the blade component from a pre-cured laminate material. The method may also include arranging a fiber material in the pre-cured laminate mold. Further, the method may include infusing the fiber material and the mold together via a resin material so as to form the blade component. Another step may include allowing the blade component to cure such that the mold forms at least a portion of an outer surface of the blade component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

Generally, the present disclosure is directed a method for manufacturing a blade component for a rotor blade of a wind turbine. For example, in one embodiment, the method may include arranging a plurality of fiber plies in a mold of the blade component. The method may also include placing at least one pre-cured laminate plate, e.g. a pultruded plate, atop the fiber plies. Thus, the pre-cured laminate plates are configured to form a tool and/or mold surface for composite parts to be infused and then remain with the produced part. For example, in certain embodiments, the pre-cured laminate material can be used as a mold during the resin infusion process by bagging directly onto the pre-cured laminate material and allowing added uncured laminates to infuse and harden directly onto the surface of the pre-cured laminate material. The pre-cured laminate material can also be used as a caul plate to help aid in the forming of un-cured laminates in a resin infusion process. Another step may include infusing the fiber plies and the pre-cured laminate plate together via a resin material so as to form the blade component. Thus, the method may further include allowing the blade component to cure, e.g. such that the pultruded plate forms at least a portion of an outer surface of the blade component.

In addition, the pre-cured laminate plate can be structural in nature such that the plate is configured to withstand loads applied to the completed part. For example, in one example, a pultrusion ply can be added to a top layer of a spar cap of the rotor blade to form a long caul plate to help reduce the effects of fiber and/or resin bridging that occurs in the resin infusion process. In another embodiment, when used as caul plates, the pre-cured laminate plates are configured to ensure good surface finish on panel joints for modular blades. In yet another embodiment, the pre-cured laminate plates can be used to form a tooling surface on which fiber plies, e.g. spar cap plies, can be laid up.

Thus, the present subject matter provides numerous advantages not present in the prior art. For example, the present disclosure is configured to reduce and/or eliminate resin and fiber bridging under the infusion bag during infusion of the component part. In addition, the present disclosure is configured to reduce tooling costs. Thus, the present disclosure improves the bag-side surface finish of composite parts which are suitable for tight tolerance fit-ups. Moreover, the method of the present disclosure reduces the need for consumable materials by using pultrusions or other laminates as a re-useable bag and/or hard tool surface.

Figure 1:
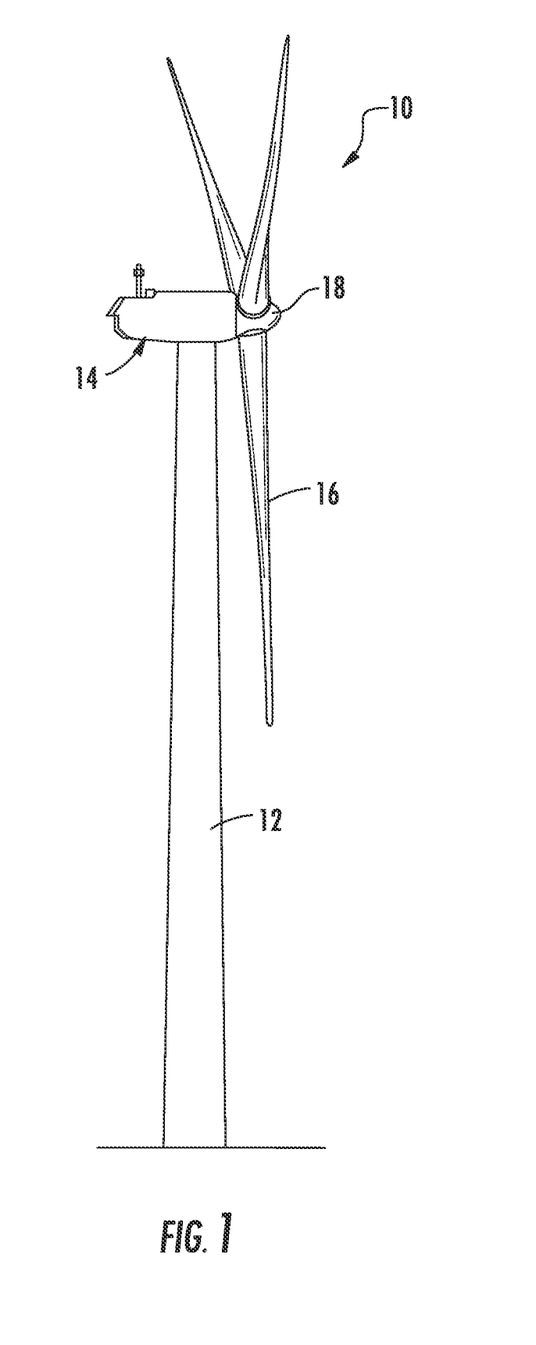
FIG. 1 illustrates a perspective view of one embodiment of a wind turbine according to the present disclosure.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
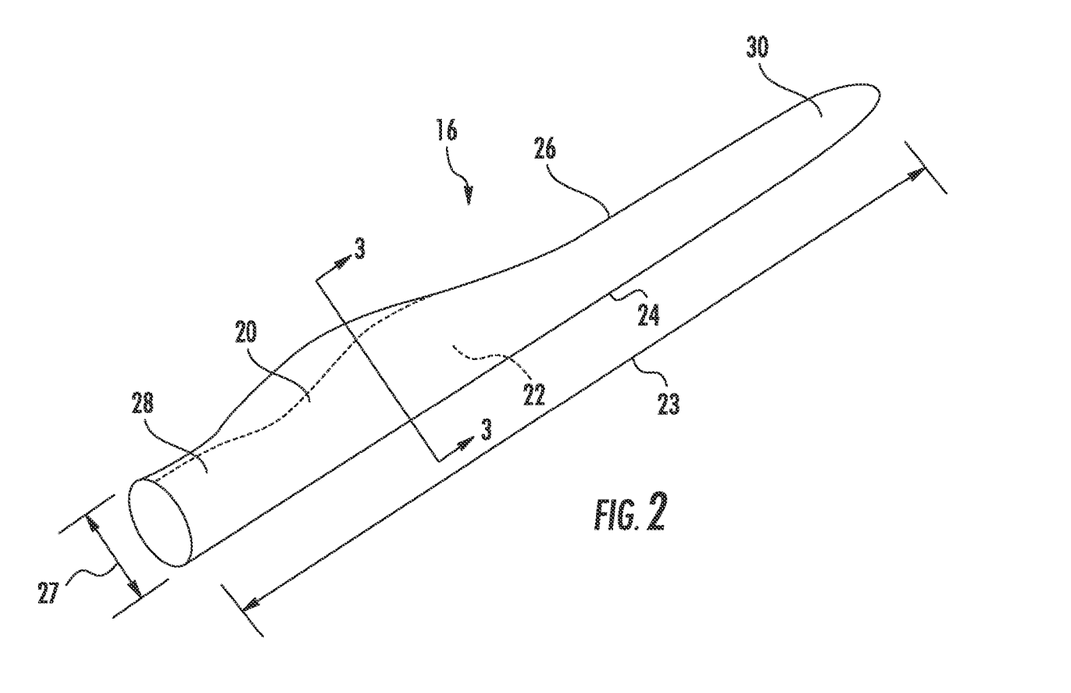
FIG. 2 illustrates a perspective view of one embodiment of a rotor blade of a wind turbine according to the present disclosure.
Figure 3:
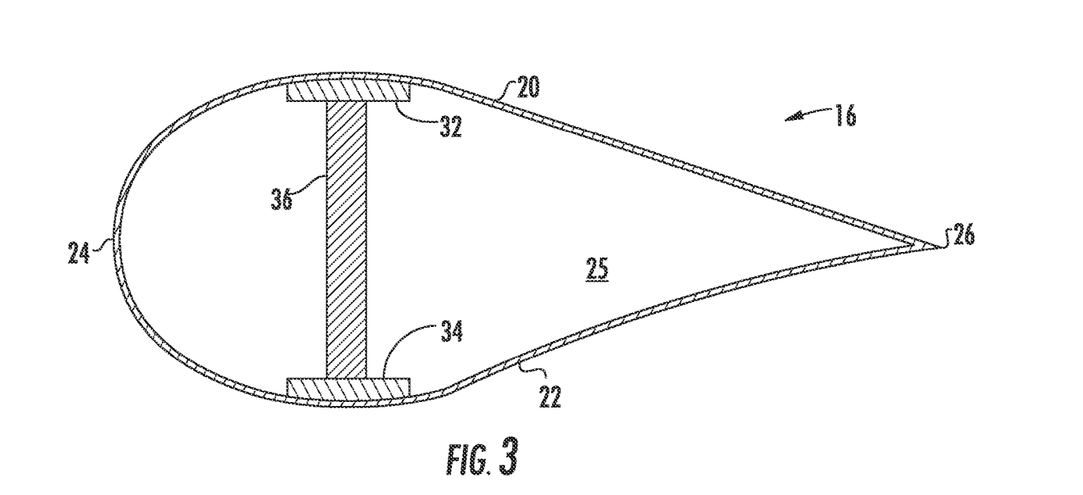
FIG. 3 illustrates a cross-sectional view of the rotor blade of FIG. 2 along line 3-3.

Referring now to FIG. 2, a more detailed view of one of the rotor blades 16 of FIG. 1 is illustrated. As shown, the rotor blade 16 includes an upper shell member 20 and a lower shell member 22. Further, the upper shell member 20 is configured as the suction side surface of the blade 16, while the lower shell member 22 is configured as the pressure side surface of the blade 16. The rotor blade 16 also includes a leading edge 24 and a trailing edge 26, as well as a root portion 28 and a tip portion 30. As is well known in the art, the upper shell member 20 and the lower shell member 22 may be joined together at the leading edge 24 and trailing edge 26 or any other suitable location so as to form the pressure and suction sides of the rotor blade 16. Further, the rotor blade 16 may also have a span 23 defining the total length between the root portion 28 and the tip portion 30 and a chord 27 defining the total length between the leading and trailing edges 24, 26. As is generally understood, the chord 27 may generally vary in length with respect to the span 23 as the rotor blade 16 extends from the root portion 28 and the tip portion 30. In addition, as shown in FIG. 3, the rotor blade 16 may also include an internal cavity 25 in which various structural members, such as spar caps 32, 34 and one or more shear webs 30 may be configured. More specifically, as shown, the upper shell member 20 contains an upper spar cap 32 configured on an internal surface thereof. Similarly, the lower shell member 22 contains a lower spar cap 34 configured on an internal surface thereof. Thus, the shear web 36 extends between the opposing spar caps 32, 34 along a longitudinal length of the rotor blade 16 in a generally span-wise direction.

Figure 4:
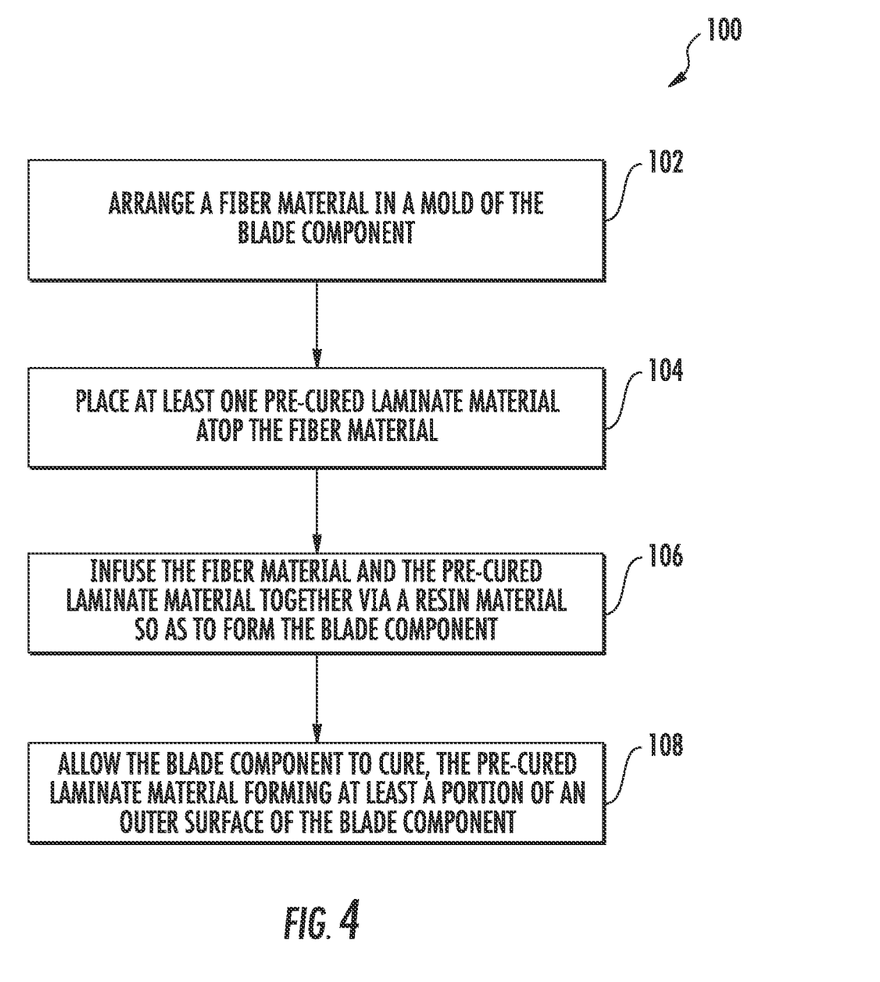
FIG. 4 illustrates a flow diagram of one embodiment of a method for manufacturing a blade component for a rotor blade of a wind turbine according to the present disclosure.
Figure 5:
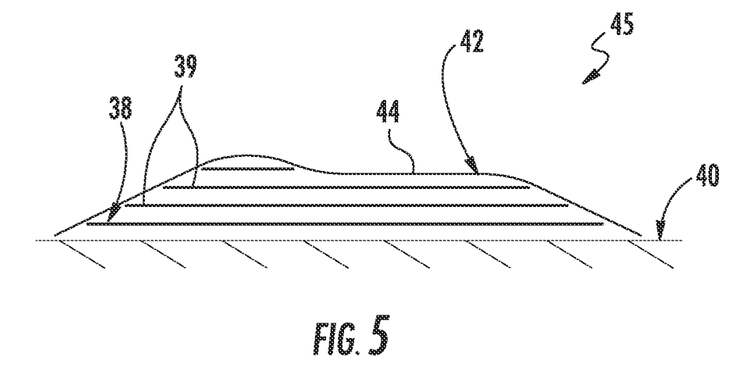
FIG. 5 illustrates a cross-sectional view of one embodiment of a rotor blade component manufactured according to the present disclosure.

Referring now to FIGS. 4-11, various processes for manufacturing a rotor blade component (e.g. blade component 45) for the rotor blade 16 of the wind turbine 10 according to the present disclosure are illustrated. For example, in certain embodiments, the processes of the present disclosure may be utilized to form any suitable blade component 45, including but not limited to the shear web 36, the spar caps 32, 34, the blade shell members 20, 22, blade segments or panels as well as corresponding joints (FIG. 6), one or more additional structural components of the rotor blade 16, blade add-ons or extensions, aerodynamic surface features (e.g. vortex generators, winglets, etc.) or any other suitable blade component. More specifically, as shown in FIG. 4, a flow diagram of one embodiment of a method 100 for manufacturing a rotor blade component 45 for the rotor blade 16 of the wind turbine 10 is illustrated. As shown at 102, the method 100 includes arranging a fiber material 38 in a mold 40 of the blade component 45. For example, as shown in FIG. 5, the fiber material 38 may include a plurality of fiber plies 39. More specifically, in certain embodiments, the fiber material 38 or plies 39 may include at least one of glass fibers, carbon fibers, metal fibers, polymer fibers, ceramic fibers, nanofibers, or combinations thereof.

Figure 6:
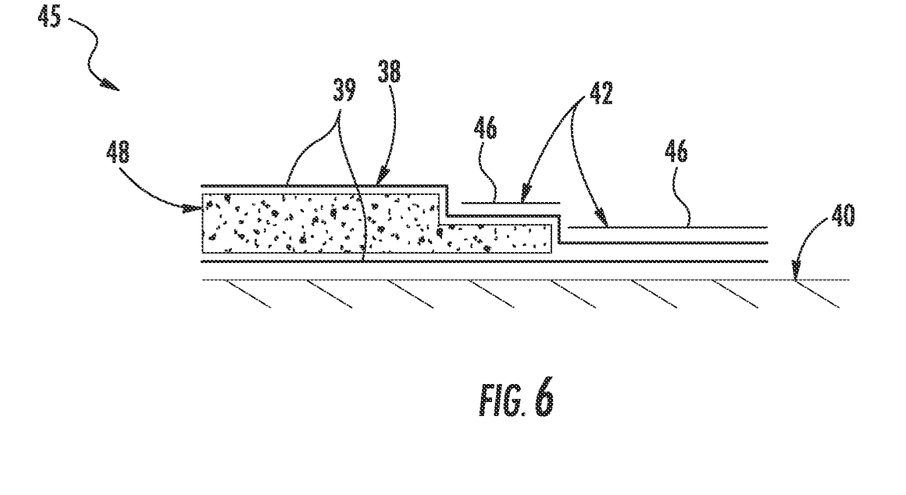
FIG. 6 illustrates a cross-sectional view of another embodiment of a rotor blade component manufactured according to the present disclosure, wherein the rotor blade component comprises a modular panel joint.

As shown at 104, the method 100 also includes placing at least one pre-cured laminate material 42 atop the fiber material 38, e.g. atop the plurality of fiber plies 39. For example, as shown in FIGS. 5 and 6, the pre-cured laminate material 42 may include one or more pre-cured laminate plies or plates 44, 46. More specifically, as shown in FIG. 5, the pre-cured laminate plate(s) 44 may be formed so as to have a predetermined shape corresponding to the desired blade component being formed. In addition, as shown in FIG. 6, the pre-cured laminate plate(s) 46 may have a generally flat configuration so as to form at least a portion of an outer surface of the blade component 45 being formed, e.g. a modular blade joint design. Thus, the various configurations of the pre-cured laminate plate(s) 44, 46 may also provide increased stiffness and/or strength to the blade component 45. In additional embodiments, as shown in FIG. 6, the method 100 may further include placing a plurality of pre-cured laminate plates 46 atop the plurality of fiber plies 39. More specifically, as shown, the method 100 may include placing a plurality of pre-cured laminate plates 46 intermittently with or atop the plurality of fiber plies 39. Thus, the pre-cured laminate plates 46 may be placed in a predetermined pattern or randomly in the mold to form at least a portion of the blade component 45.

It should be understood that the pre-cured laminate plate(s) 44, 46 may be formed using any suitable means. For example, in certain embodiments, the pre-cured laminate plate(s) 44, 46 may be formed via pultrusion such that the pre-cured laminate plate(s) 44, 46 are pultruded plates. As used herein, the terms "pultrusions," "pultruded plates" or similar generally encompasses components formed via processes that utilize reinforced materials (e.g. fibers or woven or braided strands) that are impregnated with a resin and pulled through a stationary die such that the resin cures or undergoes polymerization. As such, the pultrusion process is typically characterized by a continuous process of composite materials that produces composite parts having a constant cross-section. Thus, the pre-cured laminate plate(s) 44, 46 may include pultrusions constructed of reinforced thermoplastic materials. Further, the pre-cured laminate plate(s) 44, 46 may be formed of the same pre-cured composites or different pre-cured composites.

As shown at 106, the method 100 includes infusing the fiber material 38 and the pre-cured laminate plate(s) 44, 46 together via a resin material so as to form the blade component 45. For example, in one embodiment, the resin material may include at least one of a thermoset material, a thermoplastic material, or similar, or combinations thereof. The thermoplastic materials as described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. Further, the thermoset materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

In addition, as shown at 108, the method 100 may include allowing the blade component 45 to cure, e.g. in the component mold 40. Once cured, the blade component 45 can be removed from the mold 40 such that the pre-cured laminate plate(s) 44, 46 forms at least a portion of an outer surface of the blade component 45.

In additional embodiments, as shown in FIG. 6, the method 100 may include placing a core material 48 between the plurality of fiber plies 39. It should be understood that the core material 48 may include any suitable core material, including but not limited to, low-density foam, cork, composites, balsa wood, composites, or similar. Suitable low-density foam materials may include, but are not limited to, polystyrene foams (e.g., expanded polystyrene foams), polyurethane foams (e.g. polyurethane closed-cell foam), other foam rubbers/resin-based foams and various other open cell and closed cell foams.

Figure 7:
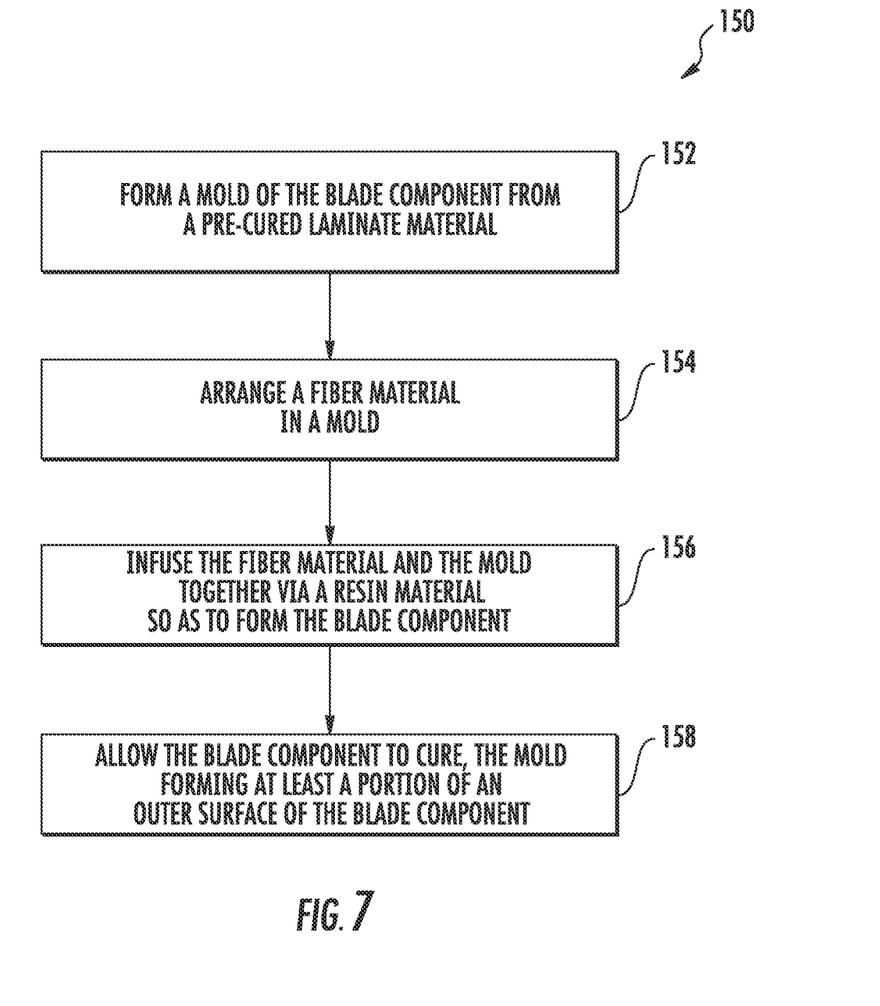
FIG. 7 illustrates a flow diagram of another embodiment of a method for manufacturing a blade component for a rotor blade of a wind turbine according to the present disclosure.
Figure 8:
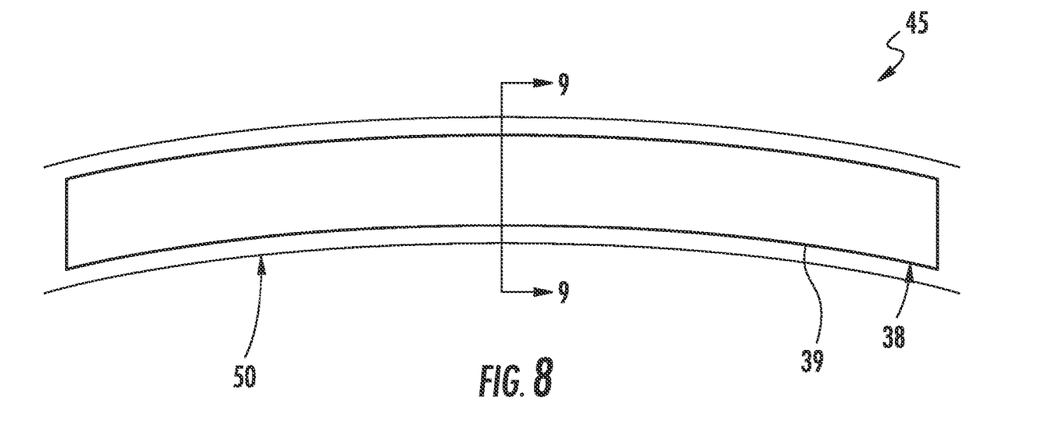
FIG. 8 illustrates a top view of one embodiment of a blade component manufactured according to the present disclosure, particularly illustrating a pultruded plate being used as a mold surface.
Figure 9:
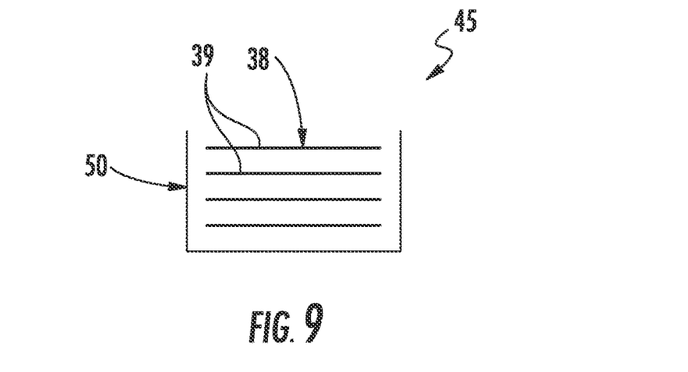
FIG. 9 illustrates a cross-sectional view of the blade component of FIG. 8 along line 9-9.

Referring now to FIG. 7, a flow diagram of another embodiment of a method 150 for manufacturing a rotor blade component 45 for the rotor blade 16 of the wind turbine 10 is illustrated. As shown at 152, the method 150 may include forming a mold 50 of the blade component 45 from a pre-cured laminate material. For example, as shown in FIGS. 8 and 9, a pre-cured laminate mold 50 may be formed via pultrusion. Further, as shown at 154, the method 150 may include arranging a fiber material 38 in the pre-cured laminate mold 50. More specifically, as stated herein, the fiber material 38 may include one or more fiber plies 39. As shown at 156, the method 150 may include infusing the fiber material 38 and the pre-cured laminate mold 50 together via a resin material so as to form the blade component 45. As shown at 158, the method 150 may also include allowing the blade component 45 to cure. Thus, the pre-cured laminate mold 50 is configured to form at least a portion of an outer surface of the blade component 45 when cured. Accordingly, in such embodiments, the pre-cured laminate mold 50 provides a mold surface for forming the part and can also remain with the completed part when cured.

Figure 10:
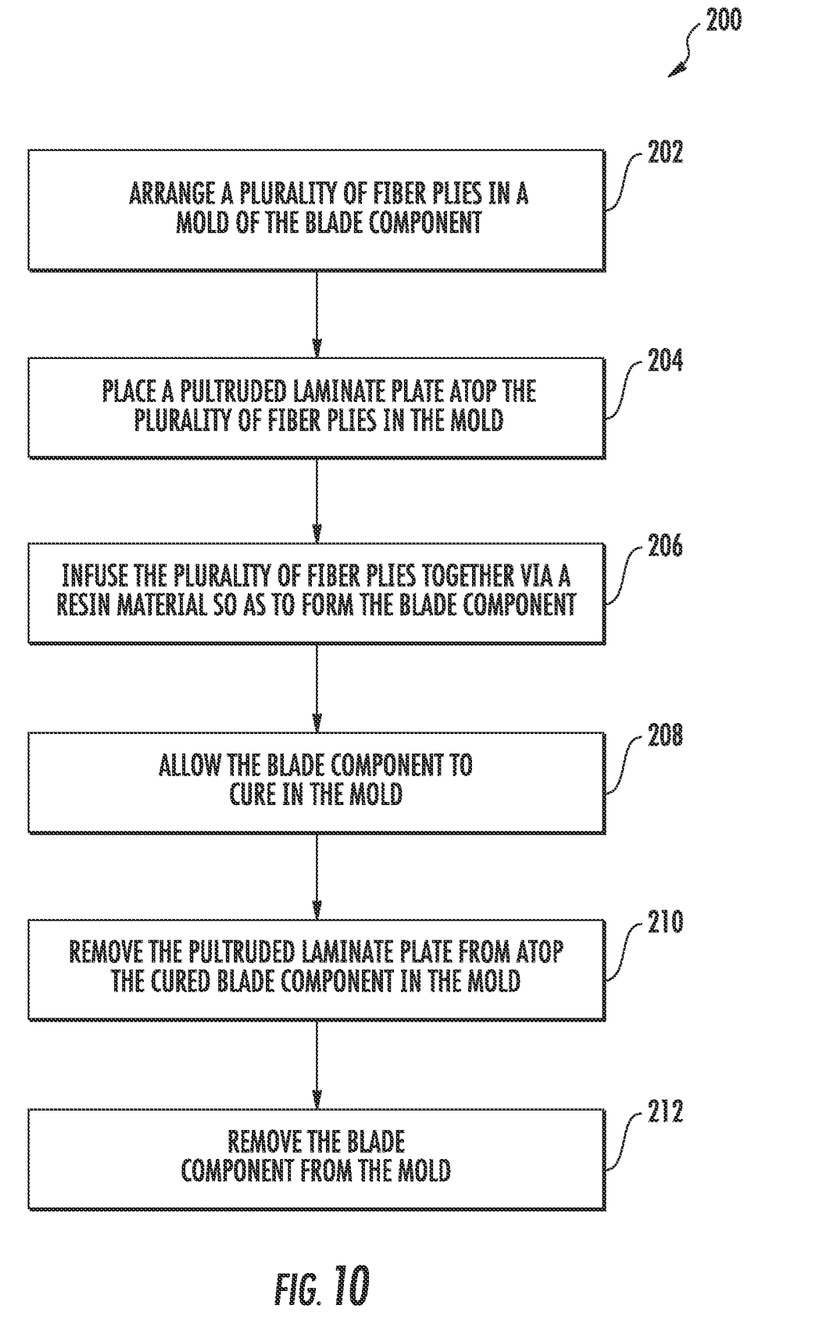
FIG. 10 illustrates a flow diagram of still another embodiment of a method for manufacturing a blade component for a rotor blade of a wind turbine according to the present disclosure.
Figure 11:
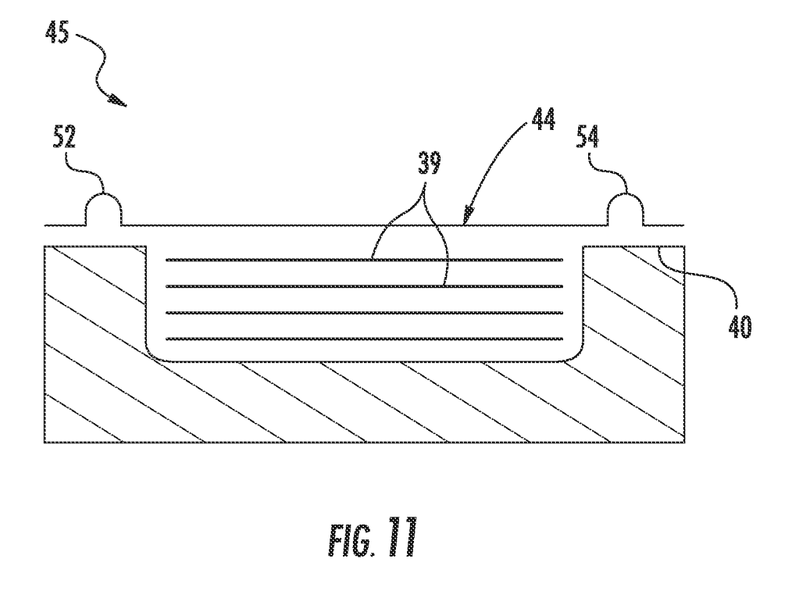
FIG. 11 illustrates a cross-sectional view of one embodiment of a blade component manufactured according to the present disclosure, particularly illustrating a pultruded plate being used as a reusable infusion aid.

Referring now to FIG. 10, a flow diagram of yet another embodiment of a method 200 for manufacturing a rotor blade component 45 for the rotor blade 16 of the wind turbine 10 is illustrated. As shown at 202, the method 200 may include arranging a plurality of fiber plies 39 in a mold 40 of the blade component 45 (FIG. 11). Further, as shown at 204, the method 200 may include placing a pultruded laminate plate 44 atop the plurality of fiber plies 39 in the mold 40. Thus, as shown at 206, the method 200 may also include infusing the plurality of fiber plies 39 together via a resin material so as to form the blade component 45. More specifically, as shown in FIG. 11, the pultruded laminate plate 44 may include at least one resin channel 52 and/or at least one vacuum channel 54 such that the pultruded laminate plate 44 assists with the infusing step. Thus, in certain embodiments, the infusing step may include vacuum assisted resin transfer molding (VARTM), resin transfer molding (RTM), or any other suitable infusion process.

Referring still to FIG. 10, as shown at 208, the method 200 may further include allowing the blade component to cure in the mold 40. As shown at 210, the method 200 may include removing the pultruded laminate plate 44 from atop the cured blade component in the mold 40. Thus, as shown at 212, the method 200 may also include removing the blade component from the mold 40 once the component has cured.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for manufacturing a rotor blade of a wind turbine, the method comprising:
    forming a curved pultruded laminate plate having a predetermined shape corresponding to an airfoil shape of an exterior surface of a blade shell of the rotor blade;
    arranging a fiber material atop a horizontal surface of a linear mold of the blade shell;
    placing the curved pultruded laminate plate atop the fiber material and the horizontal surface of the linear mold;
    infusing the fiber material and the pultruded laminate plate together via at least one of a thermoset resin or a thermoplastic resin to form the blade shell;
    allowing the blade shell to cure; and
    arranging a plurality of the blade shells together to form the rotor blade, the curved pultruded laminate plate forming and remaining a part of at least a portion of the outer surface of the blade shell.

2. The method of claim 1, wherein the fiber material comprises a plurality of fiber plies.

3. The method of claim 2, further comprising placing a core material between the plurality of fiber plies.

4. The method of claim 3, further comprising placing a plurality of pultruded laminate plates atop the plurality of fiber plies.

5. The method of claim 3, further comprising placing a plurality of pultruded plates intermittently with the plurality of fiber plies.

6. The method of claim 1, wherein the fiber material comprises at least one of glass fibers, carbon fibers, metal fibers, polymer fibers, ceramic fibers, nanofibers, or combinations thereof.

7. A method for manufacturing a rotor blade of a wind turbine, the method comprising:
    forming a curved pultruded laminate plate having a predetermined shape corresponding to an airfoil shape of an exterior surface of the blade shell;
    arranging a fiber material atop a horizontal surface of a linear mold of the blade shell;
    placing the curved pultruded laminate plate atop the fiber material and the horizontal surface of the linear mold;
    infusing the fiber material and the curved pultruded laminate plate together via at least one of a thermoset material or a thermoplastic material to form the blade shell;
    allowing the blade shell to cure; and
    arranging a plurality of the blade shells together to form the rotor blade, the curved pultruded laminate plate forming and remaining a part of at least a portion of the outer surface of the blade shell.

8. The method of claim 7, wherein the fiber material comprises a plurality of fiber plies.

9. The method of claim 8, further comprising placing a core material between the plurality of fiber plies.

10. The method of claim 9, further comprising placing a plurality of pultruded laminate plates atop the plurality of fiber plies.

11. The method of claim 9, further comprising placing a plurality of pultruded laminate plates intermittently with the plurality of fiber plies.

12. The method of claim 7, wherein the fiber material comprises at least one of glass fibers, carbon fibers, metal fibers, polymer fibers, ceramic fibers, nanofibers, or combinations thereof.

\* \* \* \* \*